US012115669B2

(12) United States Patent
Tian et al.

(10) Patent No.: US 12,115,669 B2
(45) Date of Patent: Oct. 15, 2024

(54) VARIABLE-PARAMETER STIFFNESS IDENTIFICATION AND MODELING METHOD FOR INDUSTRIAL ROBOT

(71) Applicant: NANJING UNIVERSITY OF AERONAUTICS AND ASTRONAUTICS, Nanjing (CN)

(72) Inventors: Wei Tian, Nanjing (CN); Jiachen Jiao, Nanjing (CN); Wenhe Liao, Nanjing (CN); Bo Li, Nanjing (CN); Lin Zhang, Nanjing (CN); Guangyu Cui, Nanjing (CN); Quan Bai, Nanjing (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 408 days.

(21) Appl. No.: 17/289,018

(22) PCT Filed: Oct. 8, 2019

(86) PCT No.: PCT/CN2019/109864
§ 371 (c)(1),
(2) Date: Apr. 27, 2021

(87) PCT Pub. No.: WO2020/215614
PCT Pub. Date: Oct. 29, 2020

(65) Prior Publication Data
US 2021/0347045 A1  Nov. 11, 2021

(30) Foreign Application Priority Data
Apr. 24, 2019 (CN) .......................... 201910333664.2

(51) Int. Cl.
B25J 9/00 (2006.01)
B25J 9/16 (2006.01)
(Continued)

(52) U.S. Cl.
CPC ............ *B25J 9/1653* (2013.01); *B25J 9/1607* (2013.01); *B25J 13/085* (2013.01); *B25J 19/022* (2013.01); *G06F 17/17* (2013.01)

(58) Field of Classification Search
CPC ...... B25J 9/1653; B25J 9/1607; B25J 13/085; B25J 19/022; G06F 17/17;
(Continued)

(56) References Cited

U.S. PATENT DOCUMENTS 4,753,048 A * 6/1988 Asada .................. B25J 15/0019
451/28
4,756,662 A * 7/1988 Tanie ................... B25J 17/0208
414/744.5
(Continued)

FOREIGN PATENT DOCUMENTS

CN 205449351 U * 8/2016
CN 104315995 B * 2/2017
(Continued)

OTHER PUBLICATIONS

Improving Machining Accuracy with Robot Deformation Compensation, Wang et al (Year: 2009).*
(Continued)

*Primary Examiner* — Jonathan L Sample
*Assistant Examiner* — Shaheda Shabnam Hoque
(74) *Attorney, Agent, or Firm* — Proi Intellectual Property US

(57) ABSTRACT

Disclosed is a variable-parameter stiffness identification and modeling method for an industrial robot. An effective working space of a robot is divided into a plurality of cubic regions. For an operating task in a certain machining region, different loads are applied to an end effector at multiple positions and multiple postures in the region, and robot joint stiffness in this section is identified and acquired according
(Continued)

to the relationship between the loads and an end deformation, thereby realizing accurate stiffness control of the robot in different operating sections during a machining process.

8 Claims, 2 Drawing Sheets

(51) Int. Cl.
 *B25J 13/08* (2006.01)
 *B25J 19/02* (2006.01)
 *G06F 17/17* (2006.01)
(58) Field of Classification Search
 CPC ........... G05B 2219/37065; G05B 2219/39062; G05B 2219/39183; G05B 13/042
 See application file for complete search history.

(56) References Cited

U.S. PATENT DOCUMENTS

| | | | | |
|---|---|---|---|---|
| 8,099,188 B2* | 1/2012 | Brogardh | ............... | B25J 9/1623 700/262 |
| 11,585,082 B2* | 2/2023 | Becerril | .................... | E04B 1/35 |
| 2006/0048364 A1* | 3/2006 | Zhang | ................ | B23Q 17/0966 29/709 |
| 2017/0016712 A1* | 1/2017 | Suzuki | .................... | G01B 11/14 |
| 2018/0043471 A1* | 2/2018 | Aoki | .................. | G05B 19/4083 |
| 2018/0339380 A1* | 11/2018 | Inagaki | .................. | B21J 15/142 |
| 2019/0217466 A1* | 7/2019 | Ishikawa | ................ | B25J 13/089 |
| 2019/0291271 A1* | 9/2019 | Hayashi | ................ | B25J 9/1664 |
| 2019/0337082 A1* | 11/2019 | Sakurai | .................... | B23K 9/12 |

FOREIGN PATENT DOCUMENTS

| | | | | | |
|---|---|---|---|---|---|
| CN | 107088892 A | * | 8/2017 | | |
| CN | 206493337 U | * | 9/2017 | | |
| CN | 107273576 A | * | 10/2017 | .............. | B25J 18/00 |
| CN | 107414834 A | * | 12/2017 | | |
| CN | 107703748 A | * | 2/2018 | .......... | G05B 13/042 |
| CN | 108247637 A | * | 7/2018 | ................ | B25J 9/16 |
| CN | 109255188 A | * | 1/2019 | ............. | G06F 30/17 |
| CN | 209689651 U | * | 11/2019 | | |

OTHER PUBLICATIONS

CN107414834AMultiRobotSynergisticSystemStaticStiffnessRealTimePerformanceEvaluationMethod.pdf, Li et al. (Year: 2017).*

* cited by examiner

VARIABLE-PARAMETER STIFFNESS IDENTIFICATION AND MODELING METHOD FOR INDUSTRIAL ROBOT

TECHNICAL FIELD

The disclosure belongs to the technical field of robot stiffness identification, in particular to a variable-parameter stiffness identification and modeling method for an industrial robot, and can realize accurate modeling and evaluation of robot operating stiffness.

BACKGROUND ART

As typical flexible platforms, industrial robots are highly flexible in motion and can efficiently complete complex space posture determination. At the same time, the industrial robots can quickly adjust the operating trajectory and equipment state with the support of high-performance controllers. Therefore, the industrial robots are core machining equipment in high-end manufacturing industry, especially in aerospace and other high value-added manufacturing and assembly fields (Summers M. Robot capability test and development of industrial robot positioning system for the aerospace industrial. SAE Trans 2005; 114 (1):1108-18.). Research institutions and scholars at home and abroad have carried out in-depth research on automatic assembly equipment of the industrial robots, and introduced a number of representative technical equipment (Devlieg R, Feikert E. One-up assembly with robots. SAE Aerospace Manufacturing and Automated Fastening Conference and Exhibition; 2008 September; SAE Technical Paper; 2008.), such as an O.N.C.E (One-sided Cell End effector) robot automatic drilling system developed by American E.I. company. The O.N.C.E robot automatic drilling system takes a KR350 industrial robot as a flexible machining carrier, and is equipped with a multi-functional end effector to realize automatic drilling, dimpling, and tasks for detection of aperture accuracy, dimpling depth and others of F/A-18E/F aircraft flap parts (DeVlieg R, Sitton K, Feikert E, Inman J. ONCE (One sided cell end effector) robotic drilling system. SAE Automated Fastening Conference and Exhibition; 2002 Oct. 1-3; SAE International; 2002; Devlieg R. Robotic trailing edge flap drilling system. SAE Aerospace Technology Conference and Exhibition; 2009 November; SAE International; 2009.). A robot drilling system RACe (Robot Assembly Cell) developed by German BROETJE company has been successfully applied in helicopter fuselage assembly, wing and fuselage panel assembly of small and medium-sized aircrafts (Mehlenhoff T, Vogl S. Automated fastening of aircraft cargo door structures with a standard articulating robot system. SAE Aerospace Technology Conference and Exhibition; 2009 November; SAE Technical Paper; 2009.).

However, the industrial robots in these systems are affected by inherent characteristics of their series structures, and their stiffness is only $\frac{1}{50}$-$\frac{1}{20}$ of the stiffness of a numerical control machine tool. The structural characteristic of weak stiffness leads to low tolerance of the industrial robots to the working load. On the one hand, weak stiffness of the robots will lead to the reduction of the dimensional machining accuracy; and on the other hand, weak stiffness will lead to poor cutting stability, thereby impacting the robot machining trajectory accuracy and product surface quality, and it is difficult to meet the manufacturing and assembly requirements of high value-added products with high accuracy requirements and complex assembly processes (Cen L, Melkote S N, Castle J, et al. A Wireless Force Sensing and Model Based Approach for Enhancement of Machining Accuracy in Robotic Milling [J]. IEEE/ASME Transactions on Mechatronics, 2016, 21(5):1-1.).

Michael and others found that the milling trajectory deviation of the robots was as high as 1.7 mm, the deviation was even greater when machining curves and circumferences, and the machining quality of trajectory transition sections was very poor (Zaeh M F, Roesch O. Improvement of the machining accuracy of milling robots [J]. Production Engineering, 2014, 8(6):737-744.). In the research of robot accurate drilling, Tomas and others, of Lund University in Sweden, found that due to the characteristic of weak stiffness of the industrial robots, under the action of drilling loads, end effectors of drilling will slide slightly along planes perpendicular to axes of holes, resulting in that the hole position accuracy and the aperture accuracy, the hole wall surface quality, the exit quality and others cannot meet the quality requirements of aircraft assembly holes (Olsson T, Haage M, Kihlman H, et al. Cost-efficient drilling using industrial robots with high-bandwidth force feedback [J]. Robotics and Computer-Integrated Manufacturing, 2010, 26(1):24-38.).

Aiming at the problem of weak stiffness of the robots, stiffness characteristics and stiffness modeling methods of the robots need to be studied, and identification of robot joint stiffness is a key part of robot stiffness modeling (Thomson W T, Dahleh M D, Theory of Vibration with Applications [M]. Prentice Hall, Upper Saddle River, New Jersey, 1997; Lipkin H, Patterson T. Generalized center of compliance and stiffness. [C]. IEEE International Conference on Robotics & Automation. IEEE, 1992; Li M, Wu H, Handroos H. Static stiffness modeling of a novel hybrid redundant robot machine [J]. Fusion Engineering & Design, 2011, 86(9-11): 1838-1842; Shneor Y, Portman V T. Stiffness of 5-axis machines with serial, parallel, and hybrid kinematics: Evaluation and comparison [J]. CIRP Annals-Manufacturing Technology, 2010, 59(1):409-412.). In the literature "Abele E, Weigold M, Rothenbücher S. Modeling and identification of an industrial robot for machining applications. Ann CIRP, 2007, 56(1): 387-390", when measuring the joint stiffness of each joint of a robot with five degrees of freedom, Adele E and others locked other joints and obtained joint stiffness by measuring the deformation of a target joint under the end load. However, the accuracy of the stiffness model obtained by this approximate simplified processing is not high, so it is difficult to meet the accuracy control requirements of robot stiffness modeling in the high-accuracy operating field.

In the literature "Shih-Feng Chen and Imin Kao. Conservative Congruence Transformation for Joint and Cartesian Stiffness Matrices of Robot Hands and Figures. The International Journal of Robotics Research, 2000, (19)9:835-847", Chen and others established a mapping relationship between robot joint stiffness and Cartesian stiffness, the theoretical calculation of the robot stiffness is realized, and Chen and others pointed out that end stiffness was directly related to the posture of a robot. On that basis, in the literature "Claire Dumas, Stephane Caro, Sebastien Garnier and Benoit Furet. Joint stiffness identification of six-revolute industrial serial robots. Robotics and Computer-Integrated Manufacturing, 2011, 27:881-888", Claire Dumas, Stephane Caro and others studied kinematic characteristics of a robot, and measured linear and angular displacements of a robot end by applying static loads on the robot end at different postures, so that stiffness coefficients of six joints of the industrial robot could be identified by fitting. In the literature "Alici G, Shirinzadeh B. Enhanced stiffness modeling, identification and characterization for robot manipulators. IEEE Transactions on Robotics, 2005, 21(4):554-564", to further approximate a robot state under working conditions, Alici and others installed a machining end effector on a flange of an industrial robot in advance, realized identification of a joint flexibility matrix by loading the end effector, and verified the linear elastic relationship between the robot deformation and the loads.

However, in practical application, the above methods have the following disadvantages:

(1) when a robot is executing a point position operating task (such as drilling), a joint motor is in a locking state; and when the robot is in the continuous trajectory operating (such as milling), the joint motor is not in the locking state, and the influence of the locking on joint stiffness identification results is not considered; and (2) the joint of the robot can be simplified as a torsional spring model. Inherent nonlinear characteristics of joint stiffness lead to joint angles corresponding to different robot postures, the joint stiffness identified will also be different, in other words, a set of joint stiffness identification results cannot well meet the accuracy requirements of the stiffness model of the whole working space.

SUMMARY OF THE DISCLOSURE

Aiming at the above disadvantages of the prior art, the disclosure aims to provide a variable-parameter stiffness identification and modeling method for an industrial robot to solve the problem that in the prior art, due to low applicability of static stiffness identification results to a whole working space, the accuracy of robot stiffness modeling is not ideal, the accuracy of the stiffness modeling of the industrial robot is improved effectively, and the deformation of the end of the robot under load in the operating state is predicted accurately.

In order to achieve the above purposes, the technical scheme adopted by the disclosure is as follows.

The variable-parameter stiffness identification and modeling method for the industrial robot of the disclosure includes the following steps:

Step 1: within an effective working range of a given type of industrial robot, dividing a whole operating space into a series of cubic grids according to a given maximum step length;

Step 2: using theoretical coordinates of eight vertices of one cubic grid divided in Step 1 and a center point of a grid space for controlling the robot for positioning, selecting at least 3 robot accessible postures in each position, measuring a magnitude and direction of a load attached by a six-dimensional force sensor mounted on a flange, and using a laser tracker to measure position and posture changes of a robot end before and after loading in all positions and postures;

Step 3: by collecting end loads and deformations in different positions and postures, realizing identification of robot joint stiffness satisfying an operating task of the grid space; and Step 4: according to the identification method in the grid space in Step 3 above, realizing the identification of joint stiffness of all the grids in the whole space, and establishing a stiffness model of the whole operating space.

Further, in Step 1, dividing the whole operating space into a series of cubic grids according to the given maximum step length means that: the effective operating space of the robot end is divided into three-dimensional grids to serve as a planning benchmark of robot sampling points.

Further, in Step 2, using the laser tracker to measure the position and posture changes of the robot end before and after loading in all positions and postures means that: the laser tracker is used to measure positions of a group of target balls mounted on the flange of the robot to obtain the position and posture changes of the robot end by fitting, and the six-dimensional force sensor mounted on the flange of the robot is used to realize real-time collection of the end loads.

In Step 2, by selecting the theoretical coordinates of the eight vertices of the cubic grid and the center point of the grid space for controlling the robot for positioning, the representativeness and distribution comprehensiveness of typical positions in the grid space are considered.

Further, in Step 2, by selecting a rotation axial direction of the robot around the end according to the operating type and simulating the actual operating posture of the robot, the diversity and reliability of sampling posture selection are considered.

Further, in Step 3, the collected end loads and deformations in different positions and postures include that: the conversion relationship of the positions and postures of the flange before and after loading is obtained by fitting through a least square method based on singular value decomposition.

Further, in Step 3, the structural transformation of the static stiffness model of the robot is made to obtain the relationship between the end deformations and the end loads of the robot in the given posture, and a Jacobian matrix of the robot is solved by differential transformation.

Further, in Step 4, realizing the identification of the joint stiffness of all the grids in the whole space, and establishing the stiffness model of the whole operating space mean that: the joint stiffness of each grid space is identified respectively, and the robot stiffness modeling in the whole operating space is realized by using the identification results in each grid space.

Further, in Step 3, by collecting the end loads and deformations in different positions and postures, realizing the identification of robot joint stiffness satisfying the operating task of the grid space particularly includes:

(31) recording position changes of three target balls on the flange under the different postures of the robot at each vertex of the grid space before and after stressing;

(32) fitting a position and posture change matrix of a plane in which the three target balls are located by a least square method, and regarding the matrix as a position and posture change matrix of the flange;

(33) establishing a kinematics model and a Jacobian matrix of the robot; and

(34) realizing stiffness identification in the grid space by combining the position and posture change matrix, readings of the force sensor and the kinematics model of the robot.

The embodiment of the disclosure has the beneficial effects:

1. According to the disclosure, for industrial robots of different types, the optimal step length for dividing the grid space can be determined, the workload is reduced, and the industrial robots can be put into operation quickly.
2. According to the embodiment of the disclosure, the identification method of variable-parameter joint stiffness based on operating space distribution is provided, the nonlinear characteristics of the robot joint stiffness are considered, and the established stiffness model is closer to the actual stiffness characteristics of the robots.

3. According to the embodiment of the disclosure, the accuracy of the stiffness modeling in the whole operating space of the robots can be greatly improved, the ability to predict the end deformations in cutting operation of the robots is improved, therefore the accuracy of operating of the robots is improved, and the application of the robots in the field of high-accuracy machining is expanded.

DETAILED DESCRIPTION OF THE DISCLOSURE

In order to facilitate the understanding of the skilled in the art, the disclosure is further described in combination with an embodiment and accompanying drawings below. The content mentioned in the implementation is not a limitation to the disclosure.

According to the technical scheme of the disclosure, required stiffness identification equipment mainly includes: an industrial robot, a laser tracker (or other positioning acquisition sensors) and a six-dimensional force sensor.

Figure 1:
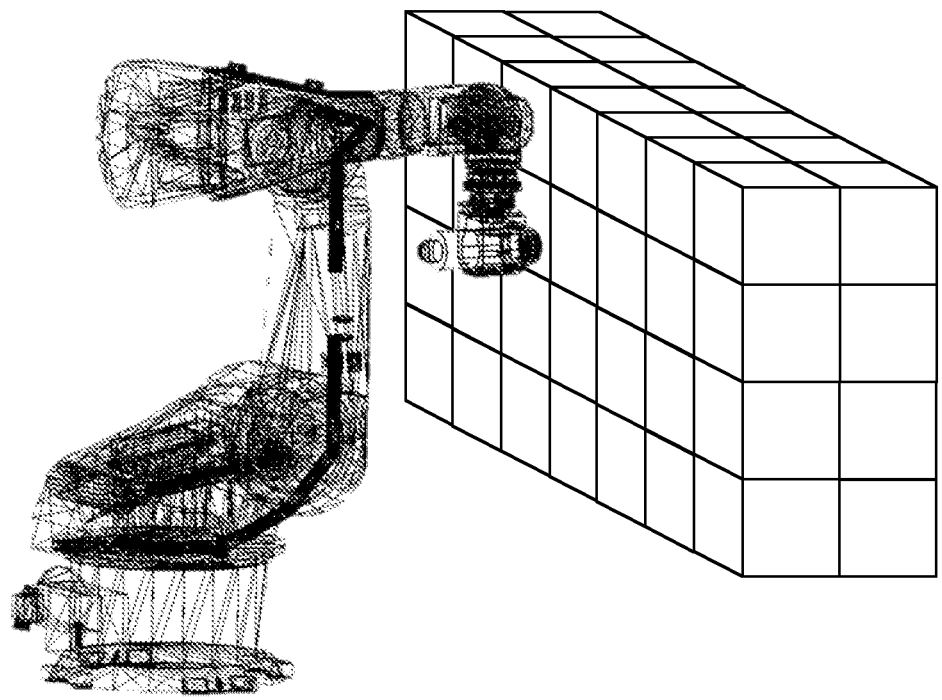
FIG. 1 is a schematic diagram of division of an operating grid space of a robot.

Referring to FIG. 1, a variable-parameter stiffness identification and modeling method for an industrial robot includes the following steps.

Step 1: the laser tracker is placed in a suitable position to facilitate measurement. The laser tracker is used for measurement, a coordinate system including a robot base coordinate system Base, a flange coordinate system Flange, a tool coordinate system Tool and a six-dimensional force sensor coordinate system Force is established, and the effective operating space of the robot is divided into a series of cubic grids according to a given maximum step length.

Figure 2:
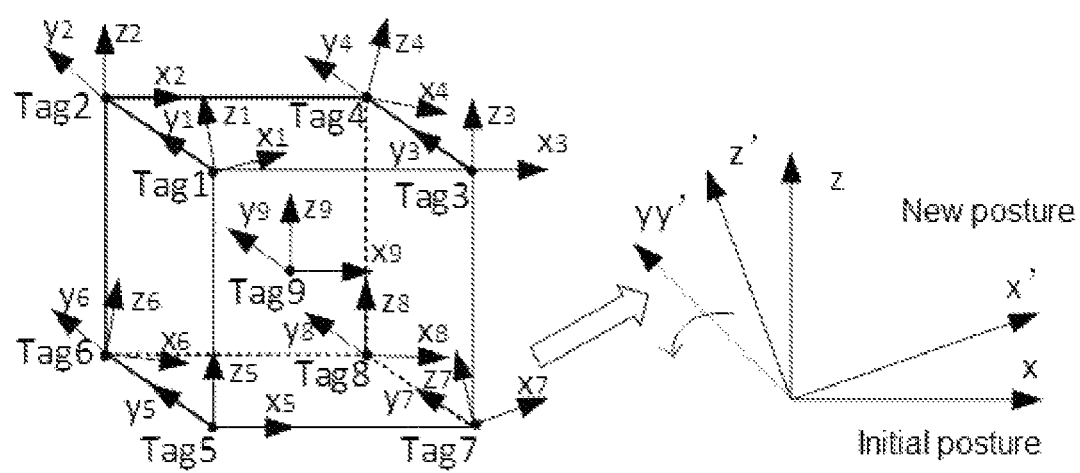
FIG. 2 is a schematic diagram of sampling positions and postures of robot stiffness identification in a grid space.

Step 2: theoretical position coordinates of eight vertices of one cubic grid divided in Step 1 and a center point of a grid space (as shown by Tag1 to Tag9 in FIG. 2, where $X_i$, $Y_i$, $Z_i$ are three directional axes of the tool coordinate system Tool under postures corresponding to end positions) are used for controlling the robot for positioning. The initial posture of each vertex position is shown in FIG. 2. The directions of three cubic edges intersecting at the point Tag5 are respectively defined as the axis direction X, the axis direction Y and the axis direction Z of an initial target position and posture, namely they are parallel to the three axis directions of the coordinate system Base.

Three other postures are selected respectively in each position. In order to simplify the operation, an appropriate angle and an appropriate step length are selected to rotate along an axis direction (e.g., the direction of an operation axis, i.e. the direction X of coordinates of a target point) of the tool coordinate system for a certain number of times to obtain a series of an appropriate number of postures at the acting position. The rotation angle of the position and posture of a new target point relative to the initial position and posture is defined as $\theta=j*\Delta\theta$, $j=1, 2, 3$, where $\Delta\theta$ is as a selected step length of a sample. A new robot posture is generated by rotating by an angle $\theta$ about a selected axis direction, and a rotation change matrix $Rot(x,\theta)$ is introduced by taking the X axis as an example:

$$Rot(x, \theta) = \begin{pmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{pmatrix}$$

Information of a new end position and posture in the position under a Cartesian coordinate system is obtained by calculating through $Tag_{now}=Rot(x,\theta)Tag$, where Tag and $Tag_{now}$ are respectively information of the end position and posture after rotation. Finally, information of all the target position and postures at the 9 target positions is obtained. The rotation changes along the axis Y and axis Z are shown below:

$$Rot(y, \theta) = \begin{pmatrix} \cos\theta & 0 & \sin\theta & 0 \\ 0 & 1 & 0 & 0 \\ -\sin\theta & 0 & \cos\theta & 0 \\ 0 & 0 & 0 & 1 \end{pmatrix} Rot(z, \theta) = \begin{pmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{pmatrix}$$

Step 3: for identifying the robot joint stiffness in the grid space, the six-dimensional force sensor is mounted on an end flange, a rigid load of a certain weight is hung on the force sensor, and the load magnitude and direction of each target position and posture in the force sensor coordinate system are obtained.

Through 3 targets mounted on the flange of the robot, the laser tracker is used to measure and indirectly obtain the reading of the deformation of a robot end before and after stressing, and position coordinate information of the two groups of targets before and after loading is read. A conversion relationship of the positions and postures of the flange before and after loading is obtained by fitting through a least square method based on singular value decomposition:

$$p'=R*p+t$$

where p and p' respectively represent the coordinate information of a point group read before and after stressing, and R and t respectively represent a rotation matrix and a translation matrix, $$p_m = \frac{1}{3}\sum_{i=1}^{3} p_i,$$

$$p'_m = \frac{1}{3}\sum_{i=1}^{3} p'_i,$$

$$H = \sum_{i=1}^{3}(p_i - p_m)(p'_i - p'_m)^T$$

where $p_i$ and $p_i'$ are respectively the position coordinates of each target ball before and after stressing, and $p_m$ and $p_m'$ are averages; singular value decomposition is conducted on H, and $H=UDV^T$ is obtained, where D is a diagonal matrix, and U and V are orthogonal matrixes; and therefore the rotation matrix and translation matrix of stressing deformation of the flange are obtained:

$R=VU^T, t=p_m'-R*p_m$.

The robot joint stiffness is identified by using a static stiffness model of the robot, and a calculating formula is:

$F=KD=J^{-T}K_\theta J^{-1}D$, where F and D are a generalized load matrix and an end deformation matrix of the flange of the robot end, K and $K_\theta$ are respectively a robot end stiffness matrix and a robot joint stiffness matrix, and J is a robot Jacobian matrix. A load vector measured at the robot end is converted to the flange coordinate system by a transformation matrix of the tool coordinate system and the flange coordinate system, the above formula is modified to: $D=JK_xJ^TF=AK_x$, where $K_x=[k_{\theta_1}^{-1},k_{\theta_2}^{-1},k_{\theta_3}^{-1},k_{\theta_4}^{-1},k_{\theta_5}^{-1},k_{\theta_6}^{-1}]^T$, $k_{\theta_1}^{-1}$ to $k_{\theta_6}^{-1}$ are reciprocals of the stiffness of the 6 joints of the robot, and A is the matrix associated with a force matrix and the Jacobian matrix, represented as:

$$A = \begin{bmatrix} J_{11}\sum_{i=1}^{6}J_{i1}F_i & L & J_{16}\sum_{i=1}^{6}J_{i6}F_i \\ M & O & M \\ J_{61}\sum_{i=1}^{6}J_{i1}F_i & L & J_{66}\sum_{i=1}^{6}J_{i6}F_i \end{bmatrix}$$

where Fi is the $i^{th}$ line of external force F, through the establishment of a robot kinematics D-H model and a method of differential transformation, the Jacobian matrix of the robot is established. Since the joints of the industrial robot are rotational joints, the $i^{th}$ column of the Jacobian matrix J is calculated according to the formula below:

$$J_{li} = \begin{bmatrix} (p \times n)_z \\ (p \times o)_z \\ (p \times a)_z \end{bmatrix} J_{ai} = \begin{bmatrix} n_z \\ o_z \\ a_z \end{bmatrix}$$

where $J_{li}$ is the rotation transformation of the $i^{th}$ column of the Jacobian matrix of the robot, $J_{ai}$ is the movement transformation of the $i^{th}$ column of the Jacobian matrix of the robot, n, o, a and P are respectively four column vectors of the transformation $_n^iT$ from each link to an end link, and $n_z$, $o_z$, $a_z$ are respectively third line values of column matrixes of n, o, and a.

The joint stiffness identification of the robot in one grid space is realized through the above calculation process.

Step 4: according to the above operation process, joint stiffness identification in each grid of the robot operating space is realized, a stiffness identification result of each grid space is selected for stiffness modeling, when the operating positions of the robot end are distributed in different grid sections, robot stiffness models matching with them are selected, and accurate control of robot operating stiffness with high operating adaptability is realized.

The specific implementation method of the disclosure will be illustrated by taking a KUKA-KR500 industrial robot as an example:

firstly, the robot is used to establish a coordinate system, and in a space of 600 mm×1200 mm×600 mm, the robot operating space is divided into 128 spatial three-dimensional grids according to a grid step length of 150 mm;

secondly, position and posture coordinate information of the robot in 9 target positions in all the grids is planned and determined in offline programming software; and as shown in FIG. 2, three different positions and postures are obtained by rotating the initial posture by ±10° around the axis Y of the tool coordinate system, so as to simulate a machining task of a curved surface within a certain range;

thirdly, the target positions and postures are sampled under a no-load state, and the positions of the target balls on the flange are recorded by the laser tracker; a 50 KG load is mounted at the end in a fixed connection mode to simulate the force at the robot end in the operating process; and the target position and posture sampling is completed again under a load state, and the position information of the target balls on the flange under the load state of the robot is recorded by the laser tracker; and finally, the load information and position and posture information collected are processed, and the robot stiffness in each grid space is calculated through a stiffness identification algorithm, so as to realize the variable-parameter joint stiffness identification in the whole operating space and accurate stiffness modeling for the robot.

Figure 3:
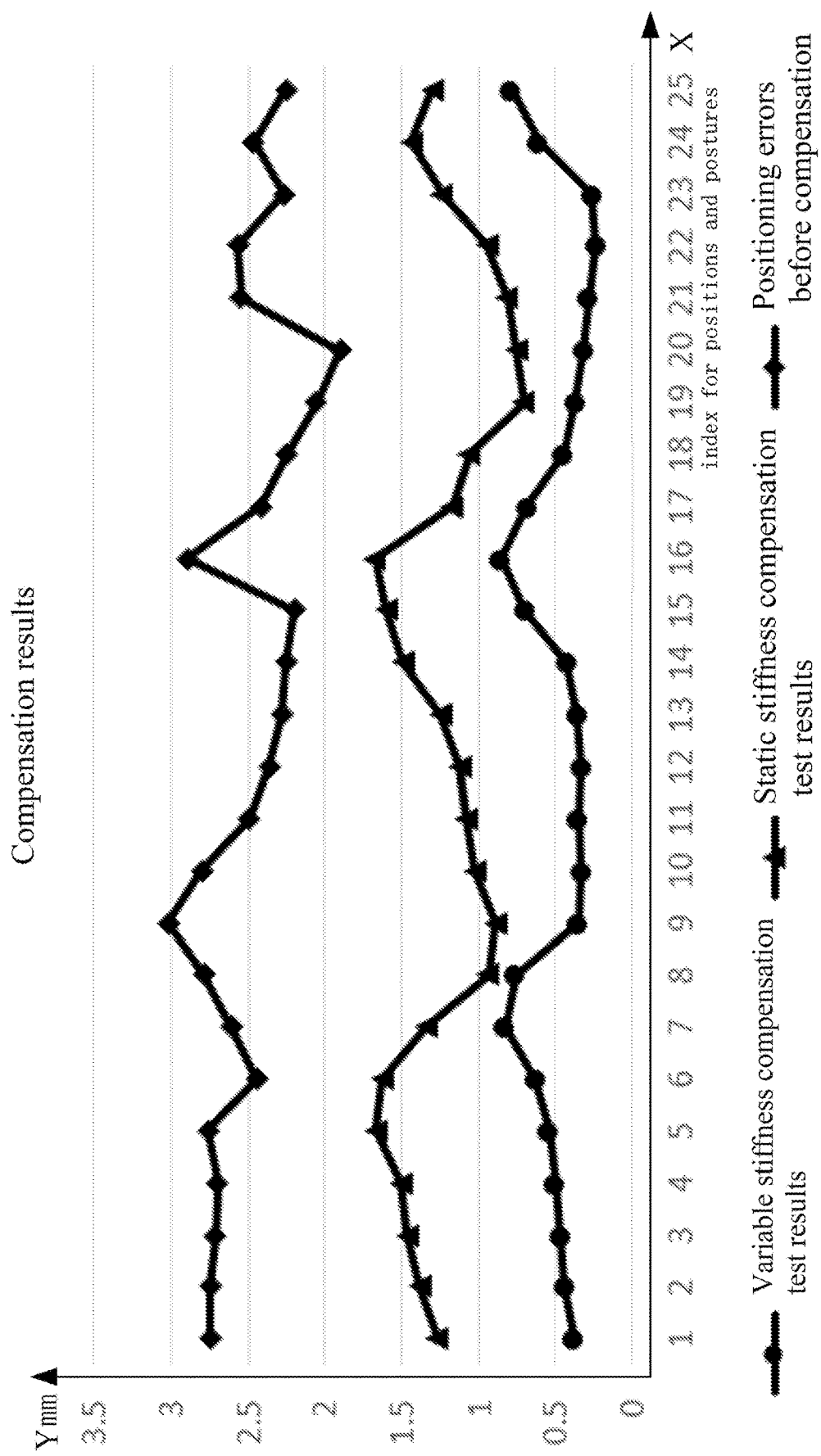
FIG. 3 is a schematic diagram of a positioning compensation effect for 25 test points.

Based on the stiffness modeling, in the process of machining, the six-dimensional force sensor is combined to measure a sensor on-line, and on-line prediction and compensation of positioning errors of the robot in a machining state can be realized. 25 positions and postures of the robot end are randomly selected, the distribution grid spaces in which these points exist are determined, and positioning compensation of the positions and postures of the robot in the load state is realized. The results are shown in FIG. 3, after compensation, the errors are improved from 2-3 mm to 1 mm or less, and the accuracy is improved to 60% or more.

There are many specific application ways of the disclosure, and the above is only a preferred implementation of the disclosure. It should be noted that, for those of ordinary skill in the art, without deviating from the principle of the disclosure, several improvements can be made, and the improvements shall also be regarded as the protection scope of the disclosure.

The invention claimed is:

1. A variable-parameter stiffness identification and modeling method for an industrial robot, comprising the following steps:
   Step 1: within an effective working range of a given type of industrial robot, dividing a whole operating space into a series of cubic grids according to a given maximum step length;
   Step 2: using theoretical coordinates of eight vertices of one cubic grid divided in Step 1 and a center point of a grid space for controlling the robot for positioning, selecting at least 3 robot accessible postures in each position of the eight vertices and the center point, measuring a magnitude and direction of a load attached by a six-dimensional force sensor mounted on a flange, and using a laser tracker to measure position and posture changes of a robot end before and after loading in all positions and postures;
   Step 3: by collecting end loads and deformations in different positions and postures, realizing identification of robot joint stiffness satisfying an operating task of the grid space; and
   Step 4: according to the identification method in the grid space in Step 3 above, realizing the identification of joint stiffness of the series of cubic grids in the whole operating space, and establishing a stiffness model of the whole operating space.

2. The variable-parameter stiffness identification and modeling method for the industrial robot according to claim 1, wherein in Step 1, the effective operating space of the robot end is divided into three-dimensional grids to serve as a planning benchmark of robot sampling points.

3. The variable-parameter stiffness identification and modeling method for the industrial robot according to claim 1, wherein in Step 2, the laser tracker is used to measure positions of a group of target balls mounted on the flange of the robot to obtain the position and posture changes of the robot end by fitting, and the six-dimensional force sensor mounted on the flange of the robot is used to realize real-time collection of the end loads.

4. The variable-parameter stiffness identification and modeling method for the industrial robot according to claim 1, wherein in Step 2, by selecting a rotation axial direction of the robot around the end according to an operating type, an actual operating posture of the robot is simulated.

5. The variable-parameter stiffness identification and modeling method for the industrial robot according to claim 1, wherein in Step 3, a conversion relationship of the position and posture of the flange before and after loading is obtained by fitting through a least square method based on singular value decomposition.

6. The variable-parameter stiffness identification and modeling method for the industrial robot according to claim 1, wherein in Step 3, structural transformation of a static stiffness model of the robot is made to obtain a relationship between end deformations and the end loads of the robot in the given posture, and a Jacobian matrix of the robot is solved by differential transformation.

7. The variable-parameter stiffness identification and modeling method for the industrial robot according to claim 1, wherein in Step 4, the joint stiffness of each grid space is identified respectively, and the robot stiffness modeling in the whole operating space is realized by using an identification result in each grid space.

8. The variable-parameter stiffness identification and modeling method for the industrial robot according to claim 1, wherein Step 3 specifically comprises:
   (31) recording position changes of three target balls on the flange under the different postures of the robot at each vertex of the grid space before and after stressing;
   (32) fitting a position and posture change matrix of a plane in which the three target balls are located by a least square method, and regarding the matrix as a position and posture change matrix of the flange;
   (33) establishing a kinematics model and a Jacobian matrix of the robot; and
   (34) realizing stiffness identification in the grid space by combining the position and posture change matrix, readings of the force sensor and the kinematics model of the robot.

* * * * *